United States Patent [19]

Kasamatsu

[11] Patent Number: 4,708,629
[45] Date of Patent: Nov. 24, 1987

[54] FILM-FORMING T DIE FOR LOW VISCOSITY RESIN

[76] Inventor: Tadashi Kasamatsu, 6-10 Shiratori 2-chome, Katsushika-ku, Tokyo, Japan

[21] Appl. No.: 831,054

[22] Filed: Feb. 19, 1986

Related U.S. Application Data

[63] Continuation of Ser. No. 628,368, Jul. 6, 1984, abandoned.

[51] Int. Cl.⁴ .............................................. B29C 47/16
[52] U.S. Cl. ..................................... 425/466; 118/315; 118/410; 118/411; 239/DIG. 1
[58] Field of Search ....................... 425/466, 461, 464; 118/208, 209, 315, 410, 411; 239/DIG. 1

[56] References Cited

U.S. PATENT DOCUMENTS

| | | | |
|---|---|---|---|
| 1,577,225 | 3/1926 | Granger | 239/DIG. 1 |
| 2,769,547 | 11/1956 | Hirsch | 239/DIG. 1 |
| 2,813,301 | 11/1957 | Underwood | 425/466 |
| 3,085,289 | 4/1963 | Van Riper | 425/376 A |
| 3,191,228 | 6/1965 | Schluter | 425/461 |
| 3,684,422 | 8/1972 | Huesing | 425/466 |
| 3,687,589 | 8/1972 | Schrenk | 425/376 A |
| 4,003,689 | 1/1977 | Harrison et al. | 425/466 |
| 4,104,015 | 8/1978 | Meyer | 425/463 |
| 4,283,168 | 8/1981 | Miller et al. | 425/466 |

FOREIGN PATENT DOCUMENTS

| | | | |
|---|---|---|---|
| 1090469 | 11/1967 | United Kingdom | 425/466 |
| 1159208 | 7/1969 | United Kingdom | 118/411 |

Primary Examiner—Willard E. Hoag
Attorney, Agent, or Firm—Armstrong, Nikaido, Marmelstein & Kubovcik

[57] ABSTRACT

A T die for extruding a low viscosity resin film coating especially in the manufacture of adhesive tapes. Uniform extrusion from the die is accomplished by the flow of melted resin from a supply manifold through a large number of narrow passageways into a smaller pressure equalizing manifold and out of a die slit extending the entire width of the die, the width of the die slit being adjustable in order to regulate the unevenness of the yield product.

3 Claims, 8 Drawing Figures

FILM-FORMING T DIE FOR LOW VISCOSITY RESIN

This applicaton is a continuation of application Ser. No. 628,368 filed July 6, 1984 now abandoned.

BACKGROUND OF THE INVENTION

1. Field of the Invention

The present invention relates to a film-forming T die for low viscosity resin. The T die of the present invention is of particular value in the manufacture of pressure-sensitive tapes using solventless adhesives.

2. State of the Art

Existing bonding agents and adhesives for paper, cloth, plastic film, and other adhesive tapes are largely the solvent type, and, for the most part, roll coater equipment is being used to apply the adhesives. As a rule, organic solvents are inflammable, there are such problems as generation of toxic gases, and a demerit of application using solvent-type adhesives is the considerable expense required for solvent recovery equipment and environmental improvement equipment. Solventless adhesives (hot melt) with a base of low melting viscosity synthetic resin of low molecular weight have lately been put to practical use, and are replacing solvent-type adhesives. However, with low viscosity synthetic resins, there are technical problems with application and film formation. T dies for film-forming synthetic resin heretofore in use, such as the hangercoat type and the fishtail type, were originally made for film formation of widely-used, general purpose resin (PVC, PE, PP, etc.). Because the general purpose resins have a considerably high viscosity even when they melt, it is possible to form a film by means of high pressure extrusion using extruders, but because the solventless adhesives have extremely low viscosity when melting, there are difficulties in carrying out thin-film application or film formation using conventional dies.

Comparing fluidity of heated low viscosity resins used for solventless adhesives with general purpose resins, as shown in FIG. 1, there is such a difference that they can't be compared using, for example, Melt Flow Rate or Melt Index, and both resins must be treated as if they have totally different properties when melting. If conventional T dies for general purpose resin are used to melt and extrude low viscosity resins, the result will be as shown in FIG. 2. Because the fluidity of the low viscosity resin extruded from the die is too high, and because resistance within the die is very low, almost all of the resin is extruded from the center part of the T die, as shown in the drawing, and a uniform film can not be formed. Industrially, the desired width of the thin film is 1000 mm or more, and with existing extrusion T die methods there was no possibility of obtaining a wide film of uniform thickness.

SUMMARY OF THE INVENTION

The general object of the present invention is to provide a T die in order to obtain a satisfactory finished product using, in general, low viscosity resin extruded film.

A specific object of the present invention is to provide a T die in order to obtain a coating useful in the manufacture of solventless adhesive tapes using hot-melt materials.

BRIEF DESCRIPTION OF THE DRAWINGS

FIG. 3A shows a cross section of die 1, FIG. 3B shows a section of FIG. 3A at line b—b, and FIG. 3C shows a section of FIG. 3A at line c—c.

DETAILED EXPLANATION OF THE INVENTION

Figure 1:
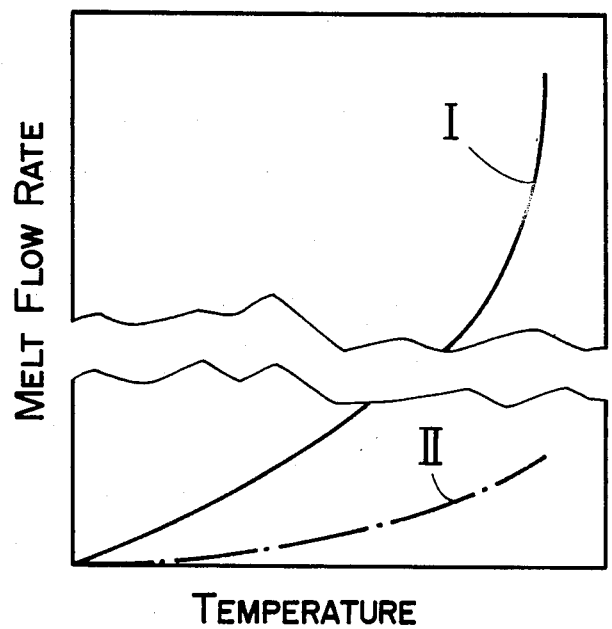
FIG. 1 is a graph comparing fluidity of low viscosity resins with that of general purpose high viscosity resins.
Figure 2:
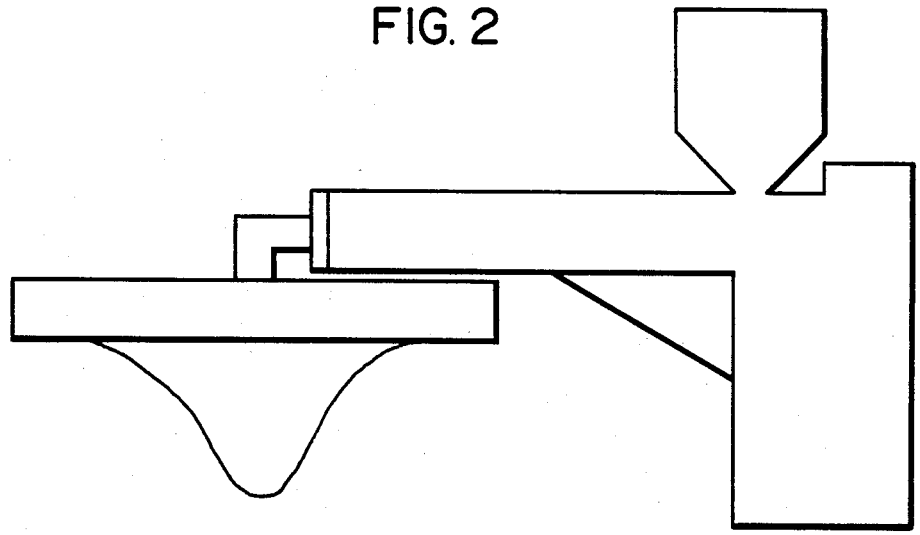
FIG. 2 is a diagram showing the result of extruded low viscosity resin employing a conventional T die.
Figure 3A:
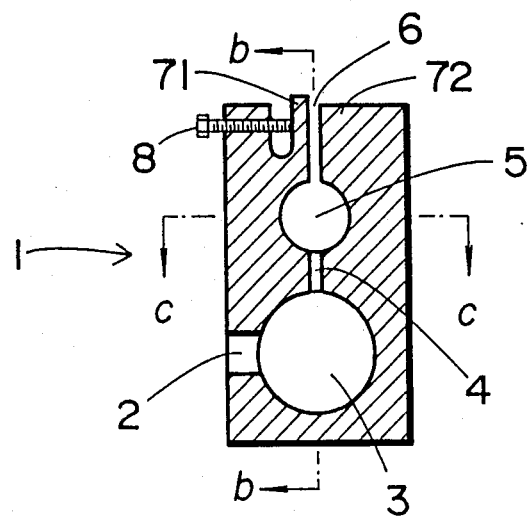
FIGS. 3A, 3B and 3C are conceptual drawings showing the structure of the T die of the present invention.
Figure 3B:
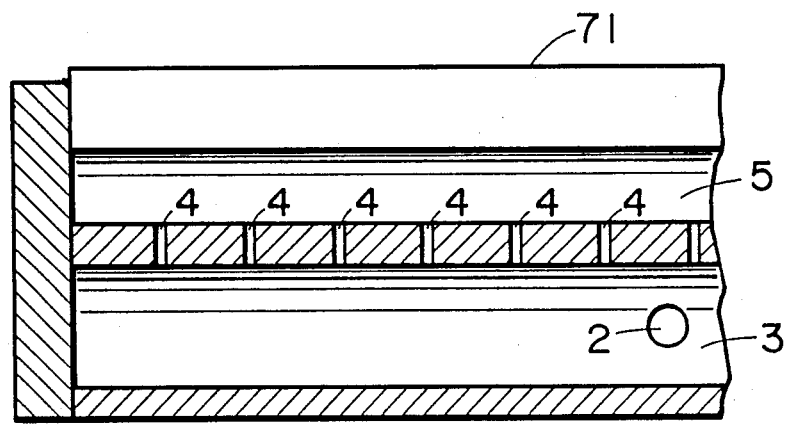
Figure 3C:
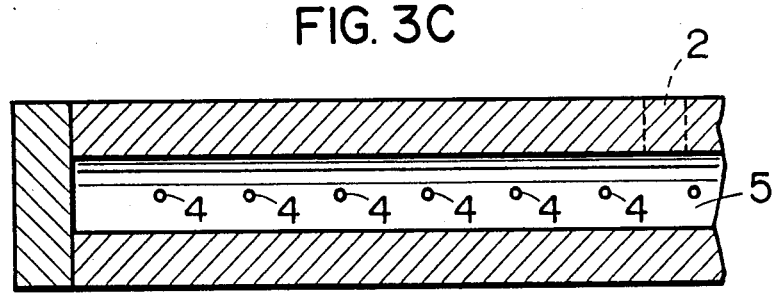
Figure 4:
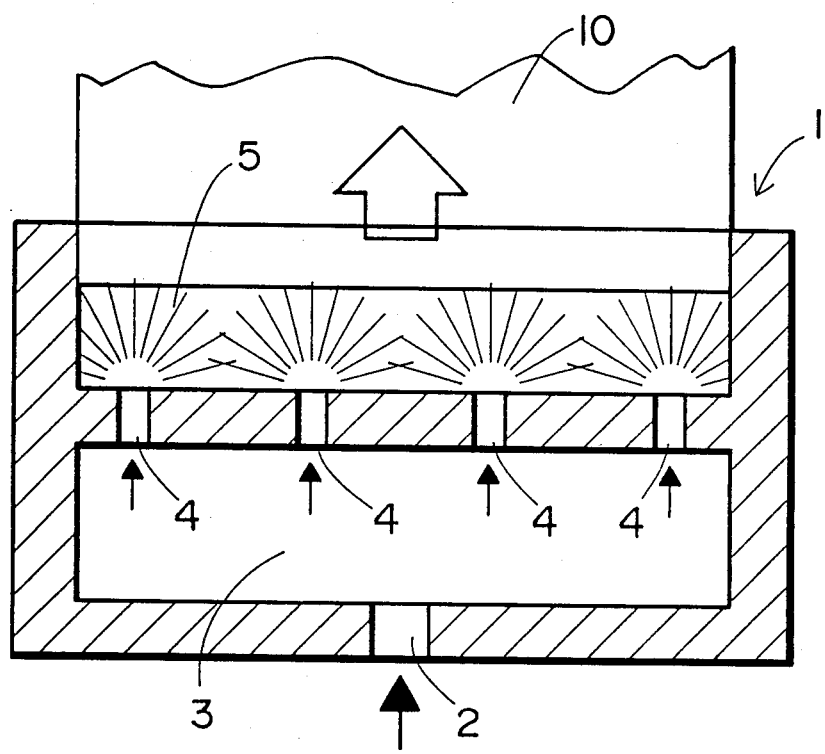
FIG. 4 is an explanatory diagram showing a typical situation in which the low viscosity resin moves uniformly through the melted resin passageways in the T die of the present invention.

One example of the structure of the low viscosity film-forming T die according to the present invention is shown in FIGS. 3A, 3B and 3C. Die 1 of the present invention is characterized in that it comprises supply manifold 3 which accepts melted resin from an extruding machine (not shown in the drawing), pressure equalizing manifold 5 which opens into die slit 6, and many narrow passageways 4 which connect supply manifold 3 and pressure equalizing manifold 5.

Figure 5:
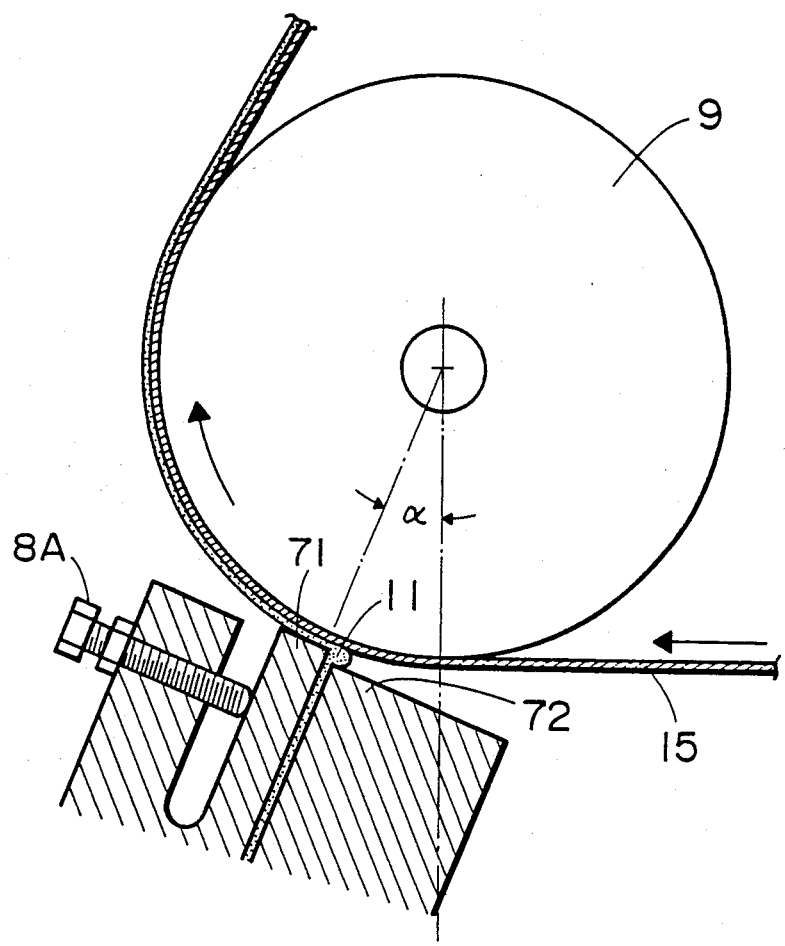
FIG. 5 is a detailed sectional view showing, along with a minute adjustment method for the die slit, one example of the T die of the present invention for putting into practice very thin coating.

The low viscosity resin which was melted in the extruding machine is injected into the die through melted resin intake 2 and fills supply manifold 3. If the pressure of the resin in supply manifold 3 reaches a prescribed level, the resin moves into and fills pressure equalizing manifold 5, at a virtually uniform pressure and flow rate, through a large number of narrow passageways 4, which extend the entire width of the die. The low viscosity resin coalesces again in pressure equalizing manifold 5, at nearly the same pressure, and in extruded as a wide thin film 10 through die slit 6 which is provided nearly uniformly along the width of die 1. A typical representation of this is shown in FIG. 5. More precisely, if the pressure of the low viscosity resin which has filled supply manifold 3 having sufficient capacity and sufficient outflow area increases, the resin passes through each of the melted resin passageways 4 and moves to pressure equalizing manifold 5 at a nearly uniform flow rate. The resin reaching pressure equalizing manifold 5 merges at virtually the same pressure and is uniformly extruded through die slit 6, which extends the entire width of the die.

To obtain a satisfactory result such as this requires a supply manifold 3 with a volume larger than the volume of pressure equalizing manifold 5, generally at least 1.5 times larger being required. Because of that it is possible to uniformly extrude the low viscosity resin from the wide die.

When the die width is large, even when a large ratio between the capacity of the supply manifold and the pressure equalizing manifold is chosen, the pressure of the melted resin in supply manifold 3 will differ depending on whether it is close to or far from the melted resin intake of the supply manifold, and the amount of resin passing through melted resin passageways 4 will also differ. It is recommended to reduce the spacing of and distribute the melted resin passageways 4 more densely as they become more distant from melted resin intake 2, or to gradually increase the sectional area of each passageway, so that there will be no considerable difference in the amount of melted resin moving into pressure equalizing menifold 5, and, therefore, so that the pressure of the resin reaching pressure equalizing manifold 5 will be nearly uniform along its entire length. Of course these steps may also be combined. The way to change the space between the melted resin passageways and the way to change their sectional areas differ according to conditions of die width and also the viscosity of the resin, but are easily determined through experimentation.

FIG. 5 shows one mode of carrying out micron order exceedingly thin coating using the T die of the present invention. The Figure shows the formation of the die, turned upward, with protruding die lips 71 and 72, which are inclined at an angle to the vertical line through the center of doctor roll 9, used to apply under pressure substrate 15, such as paper, cloth, or plastic film, to the coating. The low viscosity melted resin 11 extruded uniformly extending the total width of the substrate is coated to the substrate above it at the upper edge of the protruding lip 71 and the meridian of doctor roll 9.

Figure 6:
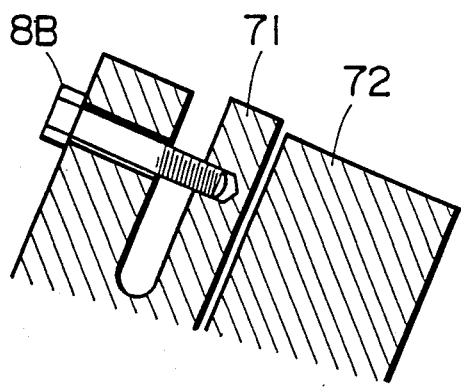
FIG. 6 is a section view corresponding to one part of FIG. 5, showing a different method of finely adjusting the die slit.

It is also recommended to make the die so as to obtain a variable die slit spacing, in order to minutely regulate the unevenness of the yielded product. FIG. 5 shows screw 8A, which can be turned in to reduce the spacing of the die lips, and FIG. 6 shows screw 8B, which can be turned in to increase the spacing of the die lips. Conventional film-forming T dies for general purpose resin were not able to achieve film formation, but with the film-forming T die of the present invention for low viscosity resin, a uniform extrusion volume, at a uniform film thickness, extending the entire width of the die slit, is realized. Consequently, the T die of the present invention is of particular value in the manufacture of adhesive tapes when pressure-sensitive adhesive coating is carried out at micron order extremely thin application thickness.

I claim:

1. A film-forming T die for a low viscosity resin comprising a die block housing defining
   a melted resin inlet for receiving said low viscosity resin;
   a supply manifold passage which communicates with said melted resin inlet; and
   a pressure equalizing manifold passage arranged substantially parallel and coextensive to said supply manifold passage and which is provided with an outlet extending along the length thereof and which forms the inlet of a die slit, said supply manifold passage and said pressure equalizing manifold passage being connected by a plurality of melted resin passageways provided along the entire lengths of the manifold passages, the cross-sectional area of the passageways per unit length of the manifold passages gradually increasing along the manifold in a direction away from said melted resin inlet, and said supply manifold passage having a volume at least 1.5 times greater than the volume of said pressure equalizing manifold passage;
   said die slit terminating in die lips and having means for adjusting the spacing of said die lips at spaced points along the slit.

2. A T-die according to claim 1 wherein said die slit has a length of 1000 mm or more.

3. A T die according to claim 1 wherein one of said die lips protrudes slightly beyond the other die lip.

* * * * *